United States Patent [19]
Szymczak

[11] 3,982,332
[45] Sept. 28, 1976

[54] SPEED READING AID AND METHOD

[76] Inventor: Walter Szymczak, 5642 S. Kolmar Ave., Chicago, Ill. 60629

[22] Filed: Feb. 6, 1975

[21] Appl. No.: 547,760

Related U.S. Application Data

[63] Continuation-in-part of Ser. No. 466,940, May 3, 1974, abandoned.

[52] U.S. Cl. ................................. 35/35 B; 40/352
[51] Int. Cl.² ....................................... G09B 17/02
[58] Field of Search ............. 35/35 R, 35 B; 40/341, 40/352; 116/119; 351/17, 18, 30–32, 39

[56] References Cited
UNITED STATES PATENTS

| | | | |
|---|---|---|---|
| 140,135 | 6/1873 | Hildreth | 35/35 R |
| 1,389,293 | 8/1921 | Bridwell | 35/40 |
| 2,996,812 | 8/1961 | Hamilton | 35/35 B |
| 3,239,950 | 3/1966 | Conry | 35/35 B |
| 3,739,739 | 6/1973 | Brase | 40/352 X |

FOREIGN PATENTS OR APPLICATIONS

| | | | |
|---|---|---|---|
| 219,881 | 8/1924 | United Kingdom | 116/119 |

Primary Examiner—William H. Grieb
Attorney, Agent, or Firm—Gary, Juettner, Pyle & Cullinan

[57] ABSTRACT

A speed reading aid is provided for reading down columns of characters of successive greater width or complexity. The device is a hand manipulated packet containing a series a removable opaque cards, each card having a one or more characteristic slots therein suitable for viewing a line of characters of a particular overall width. The cards may be arranged in the packet and manipulated to provide successive wider viewing areas. The method for improving reading speed and eye exercise involves using the device to read down one or more columns of a narrow width, and then using successively wider apertures to read down successively wider columns.

3 Claims, 7 Drawing Figures

U.S. Patent    Sept. 28, 1976    3,982,332
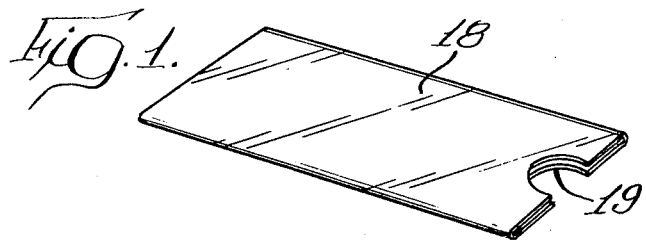
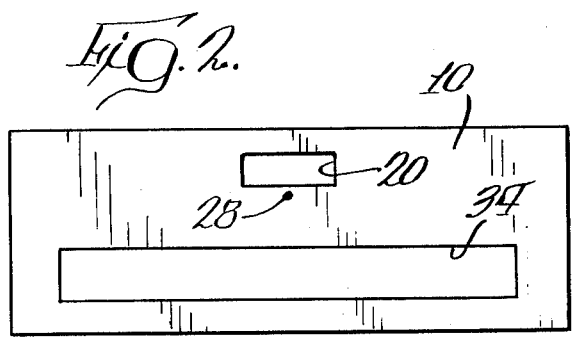
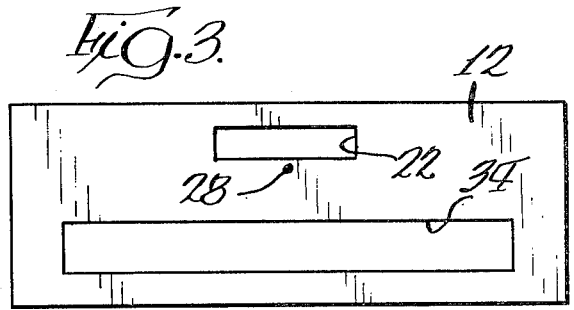
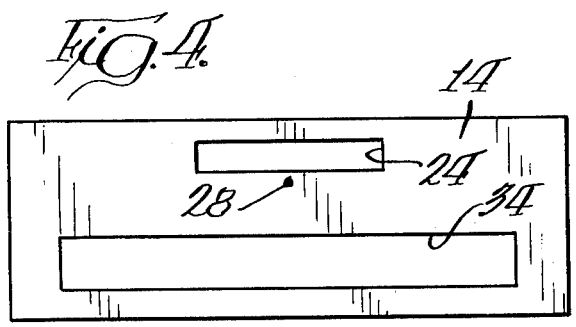
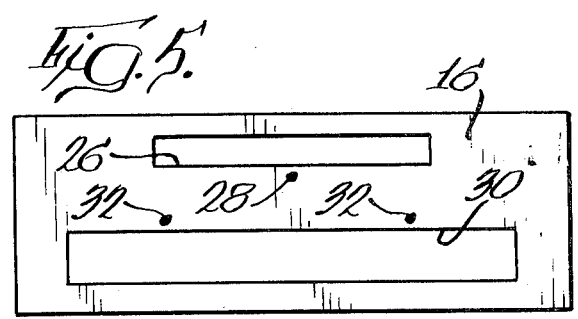
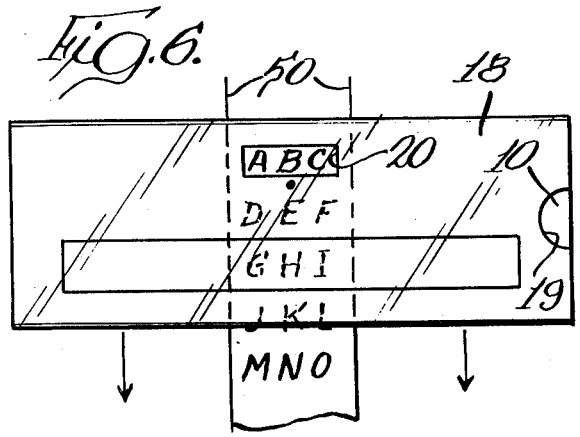
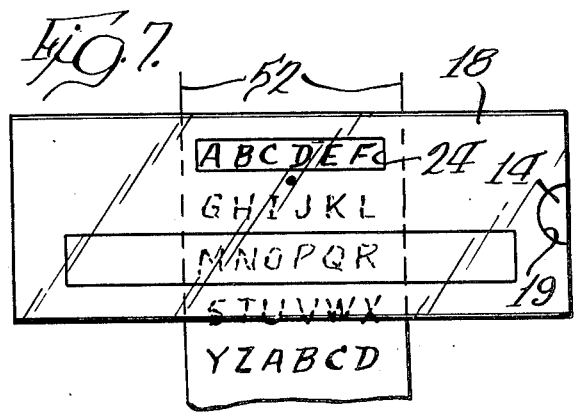

SPEED READING AID AND METHOD

CROSS REFERENCE

This is a continuation-in-part of my co-pending application, Ser. No. 466,940, filed May 3, 1974, now abandoned.

BACKGROUND OF THE INVENTION

Many devices and systems have been proposed to aid in the efficiency and speed of reading, with the object being that of training the eyes or perception to encompass a large area of print at a rapid rate. Many of these systems, however, require individual instruction or complex and expensive devices. It would be desirable to provide a simple and inexpensive device and method to make such training available to a larger segment of the population.

SUMMARY OF THE INVENTION

My invention provides a simple and inexpensive but very effective device for increasing the span and speed of character perception during reading. The device comprises a transparent envelope containing a plurality of opaque cards or other flat members, with each card having a horizontal slot or aperture of a particular width or size. The cards may be arranged in, or removed from the envelope to expose apertures of successively increasing width.

The device is intended to be used in conjunction with printed columns of words, with the columns being arranged in successive greater widths and complexity and corresponding to the aperture width of a particular card. The device is placed over the appropriate column and is moved downward by hand at the desired rate of speed. Repetition of the exercise on columns of increasing width and complexity serves to increase the rate and area of perception.

THE DRAWINGS

FIG. 1 is a perspective view of the transparent envelope or pouch that is employed in connection with the present invention.

FIGS. 2 through 5 are plan views of the various opaque cards of the invention that are superimposed and held in the envelope of FIG. 1.

FIGS. 6 and 7 are plan views showing the device of the present invention being used with various width or complexity of columns of printed material.

DESCRIPTION OF THE PREFERRED EMBODIMENT

FIGS. 1 through 5 show the device of the present invention in a disassembled condition, and the device broadly comprises a plurality of apertured cards, such as 10, 12, 14 and 16, said cards being adapted to be superimposed and held in a stacked relationship by a suitable holder, such as a transparent semi-flexible pouch 18 having a notched opening 19 at one end to enable insertion and removal of the cards. As will be evident hereinafter, any suitable means may be employed to hold the cards 10–16 in a stacked relation, provided that such means does not interfere with viewing through the apertures in the cards. The assembly is preferably substantially flat to allow sliding of the same along a flat sheet of printed material. Other suitable holding devices would include, for example, a frame or suitable clip arranged over or around the outer peripheries of the cards.

The cards 10–16 each have one or more horizontal slots or rectangular apertures 20, 22, 24 and 26 therein, preferably near one of the horizontal edges thereof. For the purposes of the present invention, the cards are preferably wider than they are long and are equi-sized to form a compact rectangular package when stacked. The cards are preferably fabricated from opaque cardboard, but may also be constructed from other materials, such as opaque plastic stock.

It may be seen that slots 20–26 have different widths and are progressively wider in succession. The height of each of the slots 20–26 is designed to be slightly greater than the height of the printed line to be read. The width of each aperture encompasses or corresponds to the width or number of a group of characters to be read in a line. As shown, a dot 28 may be provided centrally adjacent the lower edge of each single line slot to provide a point of reference or fixation for the eyes.

In addition, one of the cards may have a second aperture 30 (FIG. 5) in another portion thereof, the height of the aperture corresponding to two lines of printed characters. One or more dots, such as 32, may be provided adjacent one edge of the aperture 30 as points of reference. In the present embodiment, the other cards 10, 12 and 14 have identical two-line apertures 34 so as not to obstruct viewing through the aperture 30. The slots 30 and 34 are larger than the slots 20–26 and enable one of the cards to be reversed for viewing through the smaller slot in that card without obstruction from the other cards. In the alternative, all of the cards except one may be removed prior to the exercise.

It will be understood that various numbers and configurations of cards and slots may be employed, depending upon the complexity and number of apertures desired, to provide a device having a successive larger or wider number of viewing apertures.

In order to position one of the slots 20–26 for viewing, the card selected is preferably inverted relative to the other cards to expose one slot only. If the slot 30 is to be used, then all of the cards are inverted relative to the position shown.

FIGS. 6–8 illustrate the employment of the device in an exercise. In the first exercise, columns 50 of printed material are used having a width corresponding to the narrowest slot 20 on the first card 10. The first column 50, for example, would consist of single words. The user positions the aperture 20 over the first word, concentrates above the dot 28, and moves the device downwardly to expose successive words as rapidly as possible without losing comprehension. The opaque body of the card serves to cover adjacent lines above and below the line being read, such that only a single line can be viewed in one position of the device. In the alternative, however, the aperture may encompass more than one row of lines in a column.

After the user is proficient with the first aperture, successively wider apertures, such as 24, are used on corresponding width columns 52, as shown in FIG. 7, in order to increase the scope of perception. The size of the viewing area is thus gradually increased to encompass more complex words and a plurality of words or phrases.

I claim:

1. A hand held speed reading aid for reading columns of characters of various widths comprising a plurality of opaque cards each having a first viewing slot therein for viewing the entire width of one of said columns, the slots in said cards being of different horizontal widths corresponding to various widths of said columns, said cards being arranged in a stacked, superimposed relationship, the viewing slots in said cards being located such that the cards may be manipulated to isolate the slot of one of said cards for viewing, and means for holding said cards in said stacked relationship and accommodating said manipulation thereof, said means comprising a flat transparent pouch open at one end thereof.

2. The invention of claim 1 wherein said cards are manipulable with respect to each other in a stacked relationship to expose various ones of said viewing slots while blocking view through the other of said slots.

3. The invention of claim 2 wherein each of said cards has a second slot therein larger than the first slot, each of said cards being reversible with respect to the others to allow viewing through said first slot without obstruction from the other cards.

* * * * *